(12) United States Patent
Albero et al.

(10) Patent No.: US 11,423,160 B2
(45) Date of Patent: Aug. 23, 2022

(54) SYSTEM FOR ANALYSIS AND AUTHORIZATION FOR USE OF EXECUTABLE ENVIRONMENT DATA IN A COMPUTING SYSTEM USING HASH OUTPUTS

(71) Applicant: Bank of America Corporation, Charlotte, NC (US)

(72) Inventors: George Albero, Charlotte, NC (US); Emanuel David Guller, Charlotte, NC (US); Edward Lee Traywick, Bellbrook, OH (US); Scot Lincoln Daniels, Clover, SC (US); Rick Wayne Sumrall, Charlotte, NC (US); Elijah Clark, Charlotte, NC (US); Konata Stinson, Charlotte, NC (US); Jake Michael Yara, Mint Hill, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 159 days.

(21) Appl. No.: 16/850,561

(22) Filed: Apr. 16, 2020

(65) Prior Publication Data
US 2021/0326455 A1 Oct. 21, 2021

(51) Int. Cl.
*G06F 21/60* (2013.01)
*G06F 21/31* (2013.01)
*G06F 8/40* (2018.01)
*G06F 11/30* (2006.01)
(Continued)

(52) U.S. Cl.
CPC .............. *G06F 21/602* (2013.01); *G06F 8/40* (2013.01); *G06F 11/301* (2013.01); *G06F 11/321* (2013.01); *G06F 21/31* (2013.01); *G06F 21/6218* (2013.01)

(58) Field of Classification Search
CPC .... G06F 21/602; G06F 21/31; G06F 21/6218; G06F 8/40; G06F 11/301; G06F 11/321
See application file for complete search history.

(56) References Cited

U.S. PATENT DOCUMENTS

| | | | |
|---|---|---|---|
| 7,577,848 B2 * | 8/2009 | Schwartz | G06F 21/64 713/187 |
| 7,711,960 B2 | 5/2010 | Scarlata | |
| 7,958,373 B2 | 6/2011 | Manferdelli et al. | |

(Continued)

*Primary Examiner* — Tongoc Tran
(74) *Attorney, Agent, or Firm* — Moore & Van Allen PLLC; Nicholas C. Russell

(57) ABSTRACT

A virtual environment system for validating executable data using authorized hash outputs is provided. In particular, the system may generate a virtual environment using a virtual environment device, where the virtual environment is logically and/or physically separated from other devices and/or environments within the network. The system may then open a specified set of executable data within the virtual environment and perform a set of commands or processes with respect to the executable data. If the system determines that the executable data is unsafe to run, the system may generate a hash output of the executable data and store the hash output in a database of unauthorized executable data. In this way, the system may securely generate a repository of authorized and unauthorized hashes such that the system may ensure that unsafe executable data is blocked from being processed within a network environment.

20 Claims, 3 Drawing Sheets

(51) Int. Cl.
  *G06F 11/32* (2006.01)
  *G06F 21/62* (2013.01)

(56) References Cited

U.S. PATENT DOCUMENTS

| | | |
|---|---|---|
| 8,166,304 B2 | 4/2012 | Murase et al. |
| 8,335,317 B2 | 12/2012 | Vanstone et al. |
| 8,352,484 B1 | 1/2013 | Schneider |
| 8,352,739 B2 | 1/2013 | Park et al. |
| 8,381,303 B2 | 2/2013 | Mahaffey |
| 8,468,602 B2 | 6/2013 | McDougal et al. |
| 8,555,089 B2 | 10/2013 | Ito et al. |
| 8,656,146 B2 | 2/2014 | Findeisen et al. |
| 8,782,435 B1 | 7/2014 | Ghose |
| 8,966,318 B1 | 2/2015 | Shah |
| 9,059,853 B1 | 6/2015 | Bortz et al. |
| 9,087,199 B2 | 7/2015 | Sallam |
| 9,088,606 B2 | 7/2015 | Ranum et al. |
| 9,237,161 B2 | 1/2016 | Humble et al. |
| 9,264,220 B2 | 2/2016 | Gehrmann et al. |
| 9,294,486 B1 | 3/2016 | Chiang et al. |
| 9,305,159 B2 | 4/2016 | Fanton et al. |
| 9,363,087 B2 | 6/2016 | Hawblitzel et al. |
| 9,425,965 B2 | 8/2016 | Baumann et al. |
| 9,491,142 B2 | 11/2016 | Xie et al. |
| 9,661,009 B1 | 5/2017 | Karandikar et al. |
| 9,705,677 B2 | 7/2017 | Oxford |
| 9,779,249 B2 | 10/2017 | Wilson et al. |
| 9,838,408 B1 | 12/2017 | Karandikar et al. |
| 9,910,987 B2 | 3/2018 | Niemelä |
| 9,916,443 B1 | 3/2018 | Qu et al. |
| 9,967,333 B2 * | 5/2018 | Chen .................. H04W 12/08 |
| 9,990,504 B1 * | 6/2018 | Chapman .............. H04L 9/3297 |
| 10,243,977 B1 | 3/2019 | Srinivasan et al. |
| 10,530,768 B2 | 1/2020 | Shteingart et al. |
| 2004/0025011 A1 * | 2/2004 | Azema .................. H04L 9/0822 |
| | | 713/156 |
| 2004/0158454 A1 * | 8/2004 | Polanyi ................. G06F 40/253 |
| | | 704/4 |
| 2005/0021935 A1 * | 1/2005 | Schillings .................. G06F 8/60 |
| | | 713/1 |
| 2006/0090084 A1 * | 4/2006 | Buer ...................... G06F 21/575 |
| | | 713/189 |
| 2006/0136332 A1 * | 6/2006 | Ziegler ................ G06F 21/445 |
| | | 705/39 |
| 2007/0033419 A1 | 2/2007 | Kocher et al. |
| 2007/0260738 A1 * | 11/2007 | Palekar ................. G06F 21/577 |
| | | 709/229 |
| 2009/0249492 A1 | 10/2009 | Boesgaard Sorensen |
| 2009/0288167 A1 | 11/2009 | Freericks et al. |
| 2011/0211697 A1 | 9/2011 | Volkovs |
| 2011/0246778 A1 | 10/2011 | Duane |
| 2012/0054843 A1 | 3/2012 | Horman et al. |
| 2012/0151206 A1 | 6/2012 | Paris et al. |
| 2012/0331526 A1 | 12/2012 | Caudle et al. |
| 2013/0014260 A1 | 1/2013 | Lee et al. |
| 2013/0091571 A1 | 4/2013 | Lu |
| 2013/0117848 A1 | 5/2013 | Golshan et al. |
| 2013/0276056 A1 | 10/2013 | Epstein |
| 2014/0114857 A1 * | 4/2014 | Griggs ................... G06Q 40/00 |
| | | 705/44 |
| 2015/0244716 A1 | 8/2015 | Potlapally et al. |
| 2016/0112538 A1 | 4/2016 | Wo et al. |
| 2016/0248809 A1 | 8/2016 | Smith et al. |
| 2016/0294802 A1 | 10/2016 | Xiao et al. |
| 2017/0116413 A1 * | 4/2017 | Takacs .................... G06F 21/12 |
| 2017/0214701 A1 | 7/2017 | Hasan |
| 2017/0249483 A1 | 8/2017 | Kawazu |
| 2017/0264593 A1 | 9/2017 | Biswal et al. |
| 2017/0331837 A1 | 11/2017 | Moon et al. |
| 2018/0191726 A1 * | 7/2018 | Luukkala .............. H04L 63/101 |
| 2018/0276374 A1 | 9/2018 | Baldwin et al. |
| 2019/0089720 A1 | 3/2019 | Aditham et al. |
| 2020/0167491 A1 | 5/2020 | Grabois et al. |
| 2021/0136063 A1 | 5/2021 | Cheek et al. |
| 2021/0160265 A1 * | 5/2021 | Chittaro .............. H04L 63/1425 |
| 2021/0192065 A1 * | 6/2021 | Cuka ................... G06F 11/3051 |
| 2021/0306303 A1 | 9/2021 | Lewin et al. |
| 2021/0390193 A1 | 12/2021 | Sloane |
| 2022/0108004 A1 | 4/2022 | Corey et al. |

\* cited by examiner

SYSTEM FOR ANALYSIS AND AUTHORIZATION FOR USE OF EXECUTABLE ENVIRONMENT DATA IN A COMPUTING SYSTEM USING HASH OUTPUTS

FIELD OF THE INVENTION

The present disclosure embraces a system for secure execution of program code using cryptographic hashes that provides improved security.

BACKGROUND

There is a need for a secure way to verify the safety of program code and block use of unverified program code.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a virtual environment system for validating executable data using authorized hash outputs. In particular, the system may generate a virtual environment using a virtual environment device, where the virtual environment is logically and/or physically separated from other devices and/or environments within the network. The system may then open a specified set of executable data within the virtual environment and perform a set of commands or processes with respect to the executable data. If the system determines that the executable data is safe to run, the system may generate a hash output of the executable data and store the hash output in a database of approved executable data. In this way, the system may securely generate a repository of authorized hashes such that the system may ensure that only safely executable code is processed by the computing systems within the network environment. Authorized hashes may also be generated in a device-specific or environment-specific manner, wherein certain executable data may only be run on certain devices, system environments, and the like.

The present disclosure includes verifying a configuration (e.g., hardware, software, data therein, or the like) before the system is updated with the configuration and/or validating a configuration of a system before allowing the system to execute program code or before allowing a system to maintain a connection with a network.

With respect to the verification of a configuration, the updated configuration for a system may be verified on a virtual environment before actually being implemented on the system. Hashes may be utilized in order to define the configurations of the system being verified (e.g., regardless of whether or not the configurations are validated), as will be described in further detail herein. The hashes may define the entire configurations, or portions thereof, of the system (e.g., hardware, software, data thereof, or the like). The hashes may be created by the virtual systems, by the systems on which the configurations are proposed to be changed, and/or other systems. The hashes of the configurations may be created before allowing the configurations to be updated on the systems (e.g., before allowing the software tested on the virtual environment to be updated to the system). As such, in some embodiments of the invention the hashes determined for a configuration may be compared against hash requirements (e.g., authorized hashes, unauthorized hashes, similarities or differences between hashes of the same system or other systems, or the like). When the hashes for the proposed configuration meet the hash requirements, the configuration may be implemented on the system. For example, the hardware may be implemented on the actual system, the software may be installed on the system, the data may be stored in the system, the system may run the code on the system, or the like.

Accordingly, embodiments of the present disclosure provide a system for secure execution of program code within a virtual environment using cryptographic hashes. The system may comprise a memory device with computer-readable program code stored thereon; a communication device; and a processing device operatively coupled to the memory device and the communication device. The processing device may be configured to execute the computer-readable program code to import a set of executable code into a virtual environment instance; execute, within the virtual environment instance, one or more processes on the set of executable code; based on executing the one or more processes, perform validation of the set of executable code and generate a validation code; import target computing system configuration details; generate credentials for the executable code based on the validation code and target computing system configuration details; process the credentials using a data transformation algorithm to generate a data transformation output; and store the data transformation output in the validation database.

In some embodiments, the computer-readable program code further causes the processing device to: receive a request from a user to execute a second set of executable code; process the second set of executable code using the data transformation algorithm to generate a second data transformation output; compare the second data transformation output to one or more entries in the validation database; and block the second data transformation output based on comparing the second data transformation output with the one or more entries in the validation database.

In some embodiments, the validation database is a hash database, wherein comparing the second data transformation output to one or more entries in the validation database comprises: detecting that there is no match between the second data transformation output and any cryptographic hash value within the one or more entries in the validation database; and based on detecting that there is no match, blocking execution of the second set of executable code on the target computing system.

In some embodiments, the computer-readable program code further causes the processing device to display a denial indicator to a user via a user interface, wherein the denial indicator indicates that the second set of executable code is not authorized to be executed on the target computing system.

In some embodiments, the validation database is an authorized hash database, wherein comparing the second data transformation output to one or more entries in the validation database comprises: determining that the second data transformation output does not match any of the one or more entries in the authorized hash database; and automatically blocking execution of the second set of executable code on a target computing system.

In some embodiments, the validation database is an unauthorized hash database, wherein comparing the second data transformation output to one or more entries in the validation database comprises: detecting a match between the second data transformation output and a cryptographic hash value within the one or more entries in the unauthorized database; and based on detecting the match, automatically blocking execution of the second set of executable code on a target computing system In some embodiments, the computer-readable program code further causes the processing device to compare device configuration details or executable code version details to determine mismatch details; generate a diagnostic report; and forward the diagnostic report to one or more users.

In some embodiments, the data transformation algorithm is a cryptographic hash algorithm, wherein the data transformation output is a cryptographic hash output.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
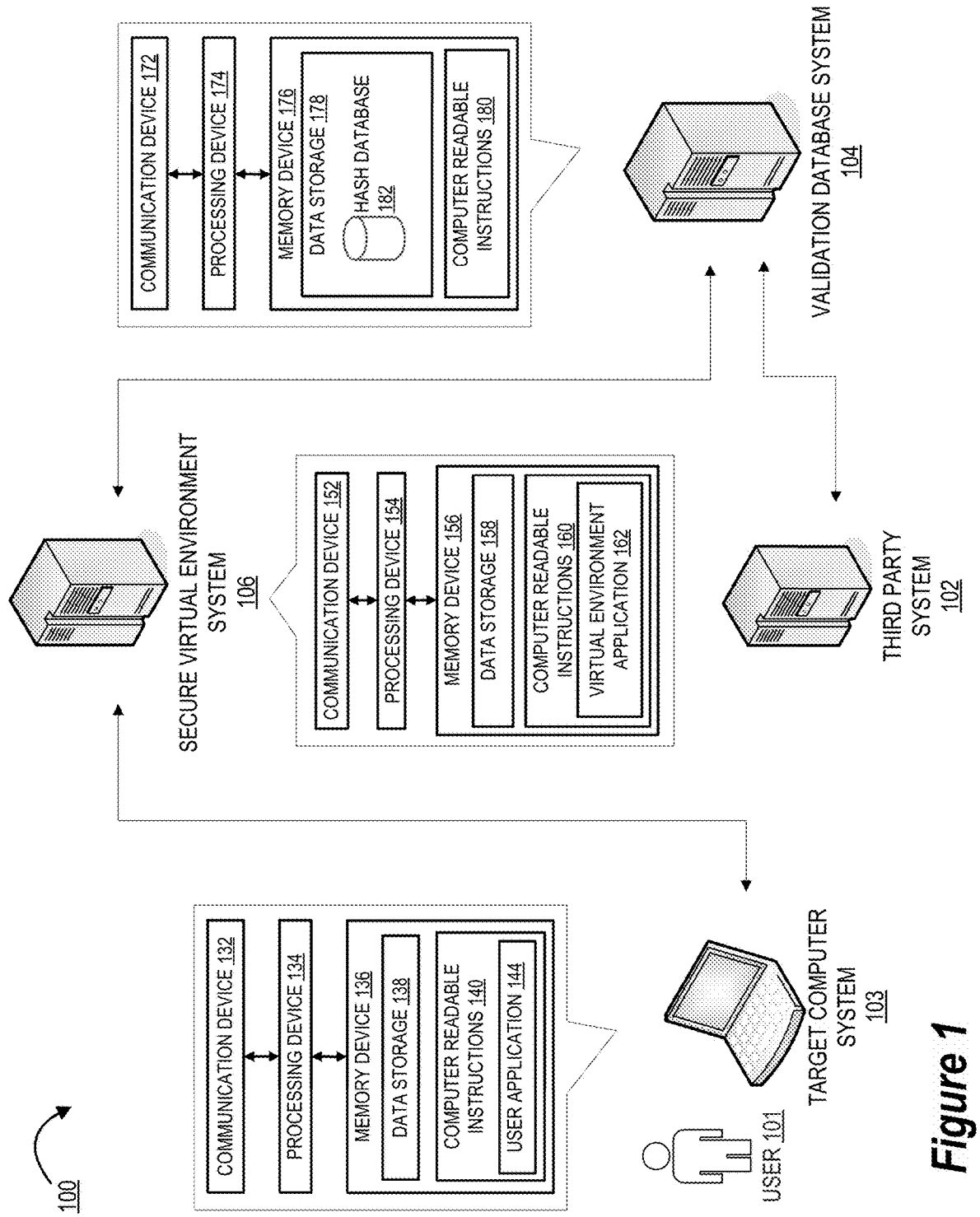
Figure 2:
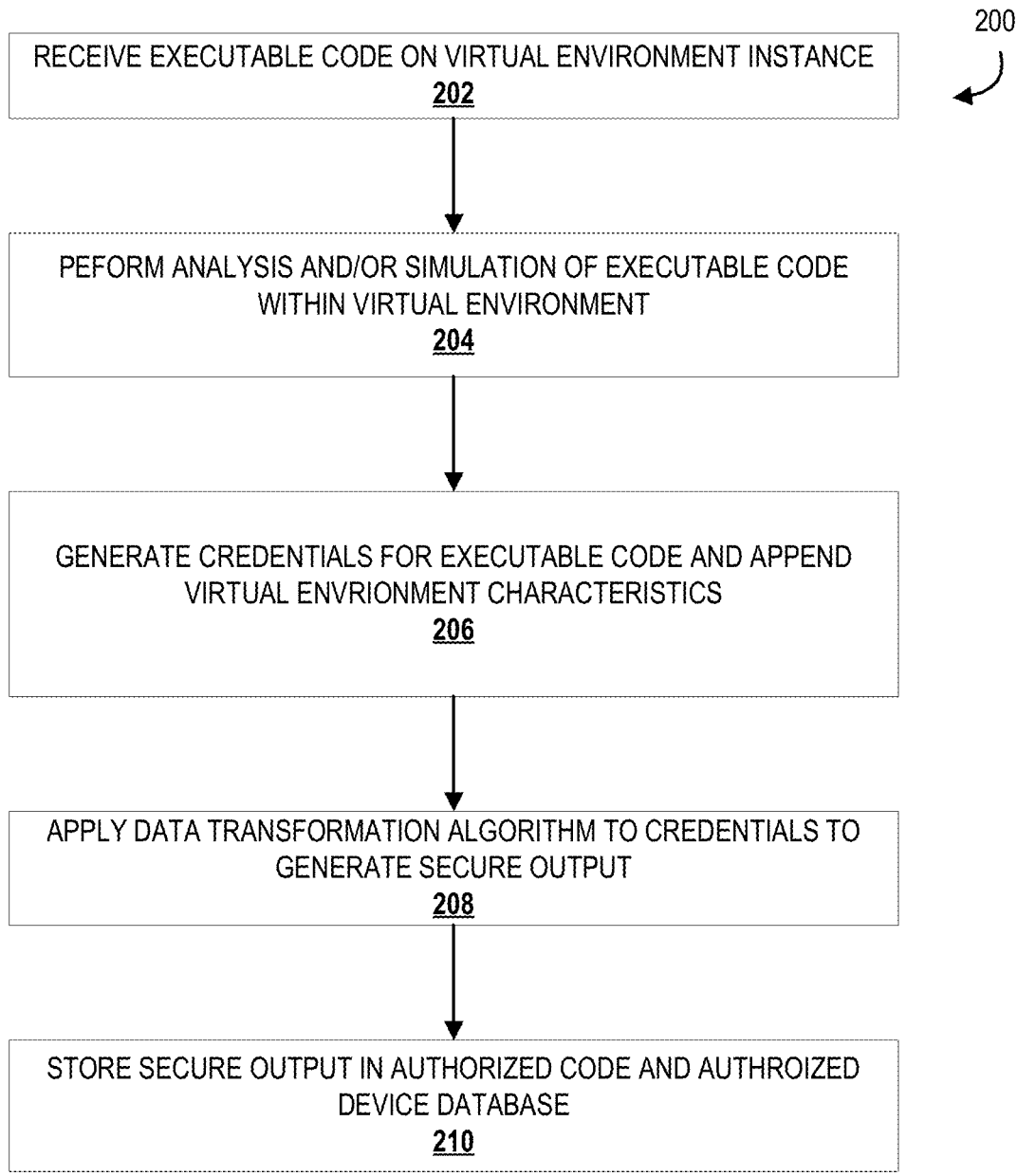
Figure 3:
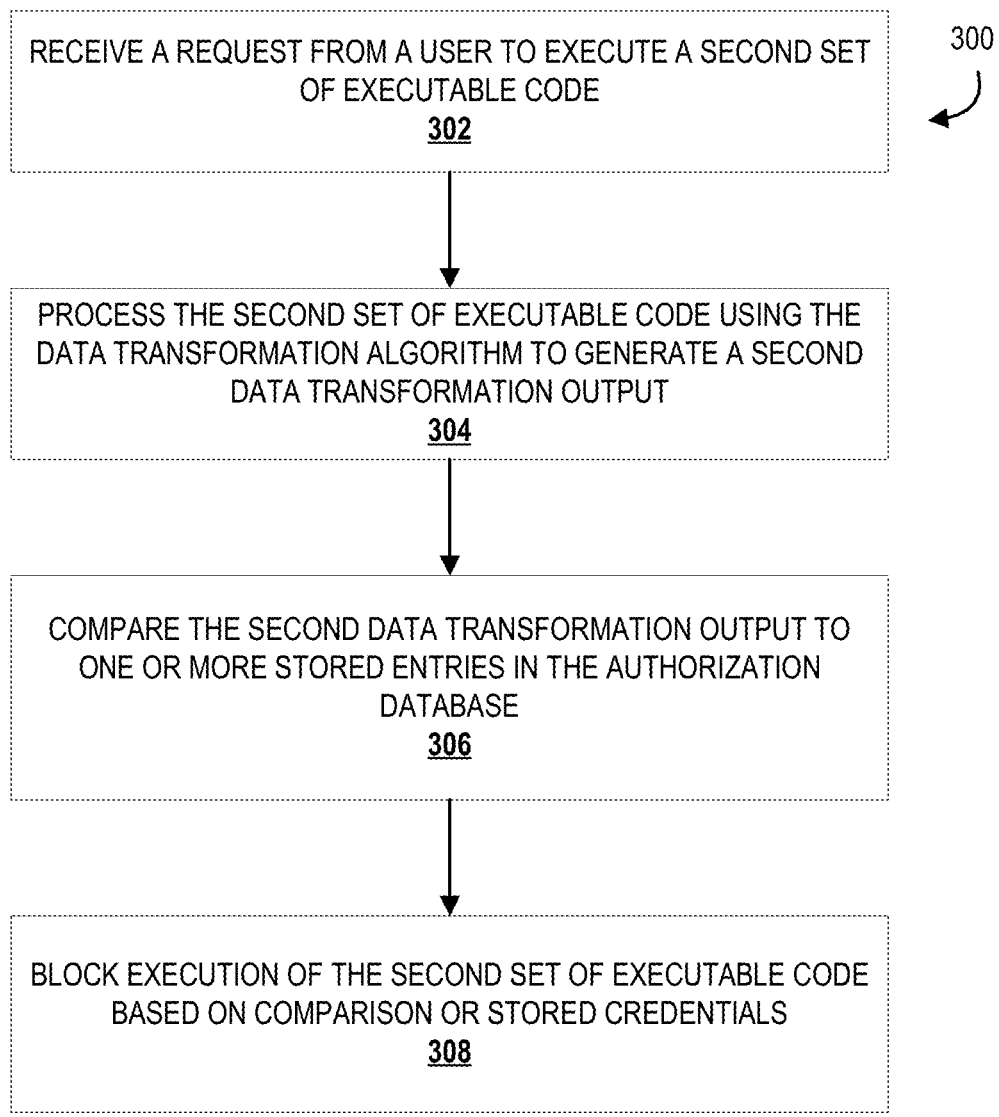

Having thus described embodiments of the invention in general terms, reference will now be made to the accompanying drawings, wherein:

FIG. 1 illustrates an operating environment 100 for the secure virtual environment system, in accordance with one embodiment of the present disclosure;

FIG. 2 illustrates a process flow 200 for analysis and transformation of executable code, in accordance with some embodiments of the present disclosure; and FIG. 3 illustrates a process flow 300 for blocking executable code using an authorization database and virtual validation instance, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual user or an organization that accesses and/or operates an online system of networked computing devices, systems, and/or peripheral devices on which the system described herein is implemented. The entity may be a business organization, a non-profit organization, a government organization, or the like, a user acting on behalf of himself/herself or on behalf of the organization which may routinely use various types of applications within its enterprise environment to accomplish its organizational objectives.

"Entity system" or "entity computer system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing system used by any entity, for example, an entity computer device within the entity system. The entity computing system may include a processor, a non-transitory storage medium, a communications device, and a display. The computing system may be configured to support user logins and inputs from any combination of similar or disparate devices. Accordingly, the computing system may be a portable electronic mobile device such as a smartphone, tablet, single board computer, smart device, or laptop, or the like. In other embodiments, the computing system may be a stationary unit such as a personal desktop computer, networked terminal, IoT device, kiosk, or the like.

"User" as used herein may refer to an individual who may interact with the entity system (e.g., a user computer system, an organization system, or the like) to access the functions therein. Accordingly, the user may be an individual acting for the user's own benefit, or an agent, employee, associate, contractor, or other authorized party who may access, use, administrate, maintain, and/or manage the computing systems within the entity system for the benefit of an organization. In other embodiments, the user may be a client or customer of the entity.

Accordingly, the term "user device" or "mobile device" may refer to mobile phones, personal computing devices, tablet computers, wearable devices, or any stationary or portable electronic device capable of receiving and/or storing data therein.

"Data transformation algorithm" as used herein may refer to a set of logical and/or mathematical operations or processes that may be executed on a specified segment of data to produce a transformation output. Accordingly, in some embodiments, the data transformation algorithm may be a cryptographic hash function or hash algorithm (e.g., MD5, Secure Hash Algorithm/SHA, or the like) which, given a specified data input, produces a cryptographic hash output value (e.g., a fixed-length character string).

"Virtual environment" as used herein may refer to a computing environment that may be physically and/or logically isolated from other environments and/or computing systems within the network. "Virtual environment instance" as used herein may refer to a particular configuration of a virtual environment that may be created for a given time period. Each virtual environment instance may have separately allocated resources, processes, system files, drivers, and applications. Accordingly, processes or code that may be executed within a virtual environment instance will only affect the state of the virtual environment instance.

"Harmful code" as defined herein may refer to executable code which may cause the execution of one or more unwanted or unauthorized processes on a target computing system (e.g., deleting or corrupting files, modifying data, encrypting files, or the like). Accordingly, harmful code may include viruses, worms, spyware, adware, or the like.

"Logic bomb" as used herein may refer to a specific type of harmful code that may execute unwanted or unauthorized processes upon detecting the occurrence of certain specific conditions. Examples of such conditions may include the occurrence of a particular date, the passage of a designated amount of time, execution of certain operations, or the like.

Executable code that causes execution of unauthorized processes may cause and/or create unintentional consequent, and may create significant operational impacts on the computing systems within a network environment. Accordingly, an entity may wish to perform validation and security testing of executable code (e.g., firmware, software applications, updates and patches, or the like) before the installation of the code is permitted to be executed and/or installed onto any of the entity's computing systems. In this regard, an entity's system may generate a virtual environment instance in which executable code may be tested and validated for execution and/or installation. Once the executable code is ready to be tested within the virtual environment, the system may execute a set of operations or commands with respect to the executable code (e.g., installing the application, using certain functions or features of the application, performing system processes, installing software updates, and the like).

One or more systems may generate a log of all actions performed within the virtual environment along with the outcomes associated with the actions performed. For instance, such outcomes may include the discovery of harmful code, software incompatibilities, driver faults, operating system errors, application bugs and/or instability, or the like. If the system detects that executing the set of operations on the executable code has not caused any detrimental outcomes to appear, the system may validate the executable code (e.g., determine that the executable code is safe to execute). In some embodiments, validating the executable code may be conditional on certain factors (e.g., the executable code is validated only with respect to certain computing systems having a particular software and/or hardware configuration). Once the executable code is validated, the system may input the executable code into a data transformation algorithm to produce a data output. For instance, the data transformation algorithm may be a hash algorithm such as of the type called secure hash algorithm ("SHA," e.g., SHA-0, SHA-1, SHA-2, and the like) such that a hash output is generated from the executable code. The hash output associated with the executable code may then be stored in an authorized/validated hash database.

Once the validated hash database is generated, new sets of executable code may be hashed to produce new hash outputs. If the new hash output matches a hash stored within the validated hash database, the system may recognize the executable code as validated and thus authorize the installation and/or execution of the executable code. If no match is detected, the system may require that the new executable code is evaluated within the virtual environment before it is permitted to be implemented (e.g., installed or executed, or the like). In some embodiments, the system may further comprise an unauthorized hash database comprising a list of executable code that the system has determined to produce undesirable effects in computing systems (e.g., the executable code contains harmful code, causes instability or crashes, or the like). In such embodiments, if the hash of a particular set of executable code matches a hash found within the unauthorized hash database, the system may automatically block the implementation of the executable code (e.g., installation or execution, or the like). In this way, the system may provide a secure way to perform validation testing of executable code that may reveal issues that may not be detectable based on a standalone review of the code, such as a line-by-line analysis of the code.

In some embodiments, the system may only allow validated executable code to be installed and/or executed on certain designated computing systems. As such, as described above, not only is the executable code being validated, but the configuration of the target computing system may be validated (e.g., the entire computer system, or portions thereof). For example, certain executable code may only be validated to run on computing systems having specific hardware and/or software configurations (e.g., to avoid unforeseen compatibility issues). In such embodiments, the system may generate hash outputs of the environment (e.g., computing system) in which the validated executable code is to be installed and/or executed (referred to herein as "environment hashes"). The environment hash may be generated using specified core information about such computing systems (e.g., operating system platform and version, installed software, hardware, connected peripheral devices, processor architecture, or the like). The environment hash may then be stored within the validated hash database (or within an environment hash database).

Subsequently, before installing or executing a particular set of executable code, computing systems may be required to not only generate a hash of the executable code for validation checking against the values within the validated hash database, but may further be required to generate an environment hash based on currently detected environment hash variables for validation checking against the values within the environment hash database. If a mismatch is detected in the hash values of the executable code or of the environment (e.g., the computing system has experienced a core hardware or software change, or the like), the system may prevent the execution of the executable code until the mismatch is remediated (e.g., the executable code and/or environment are re-validated and their respective hashes are updated within the hash database).

An exemplary embodiment is provided as follows for illustrative purposes. In one embodiment, a user (e.g., an employee or third party contractor of an entity) may be tasked with deploying a software update on the entity computing systems within an onsite network. The software update may be stored, for instance, on a portable flash memory drive held by the user. In such an embodiment, the system may comprise a designated computing system (e.g., a kiosk, or the like) which may be dedicated to running the virtual environment in which executable code is to be tested. In another embodiment, the virtual environment may be implemented on a portable drive which may be connected to another computing system to generate instances of the virtual environment on the computing system (e.g., the computing system to receive the update). Alternatively, the computer system may be on a network, and thereafter may be isolated on a separate virtual network away from its usual network.

The user may access the software update through the virtual environment (e.g., by connecting the portable drive containing the update to the kiosk, or the like). In some embodiments, the user may select a predetermined set of operations to be executed with respect to the software update (e.g., installation, or the like). In this regard, the virtual environment may display a user interface of the operating system on which the update is to be installed. In this regard, the virtual environment may simulate the exact hardware and/or software configuration of the computing systems or system environments on which the software update is to be deployed. It is understood that the virtual environment simulation may simulate another virtual environment (e.g., a thin-client or remote desktop environment, and the like), or simulate a physical system environment (e.g., a physical computer, laptop, desktop, server configuration, and the like). In this way, the user may go through a process of installing the update within the virtual environment that is identical to the process of installing the update on the target computing systems. In other embodiments, the system may automatically execute the predetermined set of operations based on the identity of the executable code to be tested, which may be determined according to file extensions, metadata, or the like. In such embodiments, the system may automatically detect the occurrence of any unauthorized or undetected activity during the testing process.

If such activity is detected by the system, the kiosk may provide feedback to the user indicating the presence of such activity. For instance, a display (e.g., a monitor, projector, or the like) of the kiosk may display an indication that the executable code is not safe to run (e.g., a red screen or a "NO GO" message). In response, the employee may recognize that the update is not to be installed on any of the computing systems on site. On the other hand, if no undesirable activity is detected during testing or if the hash of the software update matches a hash within the validated hash database, the kiosk may display an indication that the executable code is safe to run (e.g., a green screen or a "GO" message). In such scenarios, the employee may be confident that the software update may be deployed without incident. Upon completion of the validation process, the system may generate a hash of the tested code and store the hash within the validated hash database (or unauthorized hash database in some embodiments). The generated hash stored in the validated hash database may be unique to the target computing systems, or may be stored for reference by other similarly configured systems, such as other target computing systems that share the same hardware configuration, virtual environment characteristics, installed programs and applications, user permissions, connected networks, connected peripherals, and the like. In this way, the validated hash database may be used to confirm the safety of executing code on a target computing system, and infer the safety of executing the same code on one or more additional, identically configured, target computing system environments.

In other exemplary embodiments, the environment hashes discussed herein may also be used to validate entity computer systems (e.g., target computer systems that attempt to execute code). As will be described in further detail herein, when an entity computer system tries to execute code (e.g., run or install a new application or program, or the like) the environment hash of the entity computer system may be identified (e.g., captured from a stored location, determined in a virtual environment, or the like) and compared against hash requirements. If the environment hash meets the hash requirement then the entity computer system may be allowed to execute the program code. Alternatively, if the environment hash fails to meet the hash requirement then the entity computer system may be prevented from executing the program code.

Alternatively, or additionally, in other exemplary embodiments, the environment hashes discussed herein may also be used to validate that executing the program code is safe. As will be described in further detail herein, when an entity computer system on a network is updated and/or periodically the environment hash of the entity computer system may be determined (e.g., determined in a virtual environment, or the like) and compared against hash requirements. If the environment hash meets the hash requirement then the entity computer system may be allowed to execute the program code. Alternatively, if the environment hash fails to meet the hash requirement then the entity computer system may be blocked from executing the program code.

The system as described herein confers a number of technological advantages over traditional validation systems. For instance, by using a virtual environment, the system may provide a secure, isolated way of performing validation and safety testing of executable code before it is deployed on target computing systems (e.g., computers within a production environment). Additionally, environment hashes provide an efficient way of identifying entity computer systems that may be incompatible or have not yet been verified to execute certain program code (e.g., without having to analyze the configurations of the entity computer system each time the entity computer system takes an action). Furthermore, maintaining a database of validated hashes (or unauthorized hashes) may allow an entity to maintain precise version control with respect to software that may be installed on its computing systems. For instance, a particular version of program code may be safely compatible with one system environment, while a second system environment with older components or functionality may require an older version of the program code so as to avoid exposing the second system environment to security vulnerabilities.

Turning now to the figures, FIG. 1 illustrates an operating environment 100 for a secure virtual environment system, in accordance with embodiments of the present disclosure. In particular, FIG. 1 illustrates a secure virtual environment device 106 that is operatively coupled, via a network, to a target computer system 103 and a validation database system 104. In such a configuration, the secure virtual environment device 106 may, in some embodiments, transmit information to and/or receive information from the target computer system 103 and/or the validation database system 104. It should be understood that FIG. 1 illustrates only an exemplary embodiment of the operating environment 100, and it will be appreciated that one or more functions of the systems, devices, or servers as depicted in FIG. 1 may be combined into a single system, device, or server or may be split between additional systems, devices, or servers (e.g., one or more of the foregoing). For instance, the functions of the secure virtual environment device 106 and the validation database system 104 may be performed by a single computing system. Furthermore, a single system, device, or server as depicted in FIG. 1 may represent multiple systems, devices, or servers. For instance, though the target computer system 103 is depicted as a single unit, the operating environment may comprise multiple target computing systems. In addition, it is understood that the multiple systems, devices, or servers may be distributed among two or more parties or entities, as shown by the inclusion of third party system 102, which is operatively connected to the validation database system 104 via the network connection. In this way, the capabilities and stored data of validation database system 104 may be selectively accessed, leveraged, or bolstered by one or more third party systems 102. For instance, the third party system 102 may be granted access to request relevant data from the validation database system 104. In other instances, the third party system 102 may be granted access to use the secure virtual environment system 106 to analyze executable code. In further embodiments, the third party system 102 may submit relevant data about executable code in order to help build knowledge of potential harm or vulnerabilities. While only one third party system 102 is depicted in the embodiment shown in FIG. 1, it is understood that any number of third party systems 102 may be configured to interface with the validation database system over the network.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the secure virtual environment device 106 may be a computing system that hosts the virtual environment and allows for the testing of executable code as described elsewhere herein. Accordingly, the secure virtual environment device 106 may comprise a communication device 152, a processing device 154, and a memory device 156. The secure virtual environment device 106 may be a device such as a networked server, desktop computer, terminal, kiosk, or any other type of computing system as described herein. In other embodiments, the secure virtual environment device 106 may be a portable storage device such as a portable hard drive, flash memory drive, memory card, or the like. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 may be operatively coupled to the communication device 152 and the memory device 156 such that the processing device 154 uses the communication device 152 to communicate with the network and other devices on the network, such as, but not limited to the target computer system 103 and the validation database system 104. In this regard, the communication device 152 generally comprises any wired or wireless device, such as a modem, antennae, WiFi or Ethernet adapter, radio transceiver, electrical connection, electrical circuit, or other device for communicating with other devices on the network. The one or more communication device 152 may further include an interface that accepts one or more network interface cards, ports for connection of network components, Universal Serial Bus (USB) connectors and the like.

The memory device 156 may have computer-readable instructions 160 stored thereon, which in one embodiment includes the computer-readable instructions 160 of an virtual environment application 162, such as dedicated applications (e.g., apps, applet, or the like), portions of dedicated applications, web browser or other apps that allow access to applications located on other systems, or the like. The computer-readable instructions 160 may comprise computer-executable program code which may instruct the processing device 154 to perform certain logic, data processing, and data storing functions of the application to accomplish the entity's objectives. For instance, the virtual environment application 162 may contain the instructions needed to generate instances of the virtual environment for validation testing. In some embodiments, the memory device 156 includes data storage 158 for storing data related to the system environment.

As further illustrated in FIG. 1, the operating environment 100 may further comprise a target computer system 103 in operative communication with the secure virtual environment device 106. The target computer system 103 may be a computing system that is operated by a user 101, such as an administrator, agent, or employee of the entity. In other embodiments, the user 101 may be a user which is external to an organization, such as a customer or client of the organization. Accordingly, the target computer system 103 may be a device such as a desktop computer, IoT device, mobile device (e.g., phone, smartphone, laptop, tablet, single-board computer, or the like). The target computer system 103 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The target computer system 103 may comprise a processing device 134 operatively coupled to a communication device 132 and a memory device 136 having data storage 138 and computer readable instructions 140 stored thereon. The computer readable instructions 140 may comprise a user application 144 which may receive inputs from the user 101 and produce outputs to the user 101. Accordingly, the user application 144 may include an operating system, application suite, or the like. In some embodiments, instances of the virtual environment may be modeled based on the target computer system 103 and the hardware and/or software found therein.

The operating environment 100 may further comprise a validation database system 104. The validation database system 104 may be a computing system that may store hashes of executable code tested within the virtual environment. Accordingly, the validation database system 104 may comprise a processing device 174 operatively coupled to a communication device 172 and a memory device 176 comprising data storage 178 and computer readable instructions 180. A hash database 182 (which may be referred to herein as a "validation database") may be stored within the data storage 178 of the validation database system 104, where the hash database 182 contains the hashes of executable code that has been tested. In some embodiments, the hash database 182 may be an authorized hash database which stores hashes of executable code that has been validated (e.g., code that has been determined by the system to be safe to install and/or run). In other embodiments, the hash database 182 may be (or further include) an unauthorized hash database which stores hashes of executable code that is unauthorized (e.g., code that has been determined to produce undesirable effects) to be installed or executed on computing systems within the operating environment 100 (e.g., the target computer system 103). In embodiments in which the validated hashes are tied to certain computing systems, the hash database 182 may further comprise environment hashes of computing systems which have been approved to install and/or execute the executable code as defined by the system. It is understood that while the hash database 182 is discussed herein with respect to some embodiments as storing data generated by the secure virtual environment system, the hash database 182 may also receive or share relevant data from one or more third party systems 102. In some embodiments, sharing data between the validation database system 104 and one or more third party systems 102 may be accomplished using a custom application programming interface (API), wherein third party entities and users may be authenticated on a varying basis. For instance, certain third party entities or users may only be granted access to submit relevant data, while other third parties or third party users may be granted access to request data from the validation system (e.g., authorized remote users may issued usernames and passwords to be authenticated via these user credentials such that they can access a subset of data on the validation database system). In some embodiments, the validation database system may provide data access via a graphical user interface on a user application, such as an application stored on a mobile device or computing system, or an application accessed remotely through a web portal, or the like. In this way, users can use their user credentials to log in to a virtual dashboard and interface with the validation database system 104. In such embodiments, the system may be configured to import hash output values from a third party computing system (e.g., a hash database server owned and/or operated by the third party) and incorporate the hash output values into the authorized hash database. In this way, the system may be able to efficiently control the execution of executable code within its network environment without expending computing resources unnecessarily by retesting the executable code.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system. The communication devices may comprise one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications (e.g., dedicated applications, apps, applets, applications accessed through a web browser, or the like), which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip. It should be understood that when discussing an application, the entire application may be located on a single system, or a portion of an application may be located on a single system, while other portions are located on one or more additional systems.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The communication devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include one or more memory devices operatively coupled to one or more processing devices. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The one or more memory devices may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for analysis and transformation of executable code, in accordance with some embodiments of the present disclosure. As shown in FIG. 2, the process 200 begins at block 202, wherein the system receives executable code to be run on a virtual environment instance. In some embodiments, the executable code may be imported to the virtual environment system by a computing system within the network environment that attempts tot execute or install the executable code, whereby a user controlling the computing system within the network environment initiates the virtual environment instance. In other embodiments, the system may require executable code to be imported to a virtual environment system automatically, such that the user of the computing system within the network environment is prompted to or presented with a virtual environment instance in response to the user attempting to execute or install the executable code. For instance, in an exemplary embodiment, a user such as an employee of an entity may be tasked with installing a certain application on a number of computing systems within the entity's network environment. The user may be in control of a copy of the set of executable code which may be stored on a portable drive or, in other embodiments, a network drive. The user may load the set of executable code onto a dedicated validation kiosk configured to generate instances of the virtual environment. In other embodiments, the virtual environment software may be included on the portable drive such that virtual environment instances are generated using the computing systems on which the application is to be executed and/or installed (which may be referred to herein as "target computing system"). The system may generate one instance of the virtual environment for each set of executable code to be validated. Each instance of the virtual environment may simulate the hardware, software, operating system, drivers, libraries, and the like of target computing system. The virtual environment may further be separated physically and/or logically from the target computing system. In this way, the system allows for the secure containment of the set of executable code such that the executable code may be evaluated without impacting the target computing systems.

The process continues to block 204, where the system performs analysis or simulation of the executable code within the virtual environment instance. The system executes, within the virtual environment instance, one or more processes on the set of executable code. The one or more processes may be executed based on the characteristics of the executable code (e.g., the executable code is used in the manner in which the executable code is intended to be used). For instance, if the executable code is an application, the one or more processes may include interacting with the application and/or using certain functions of the application (e.g., interacting with UI elements, hardware peripherals, application programming interface calling functions, contacting other device within the network environment, accessing locally stored data, accessing remote data, or the like). In another embodiment, if the executable code is an installation file (e.g., an application setup file), the one or more processes may comprise performing installation using the installation file. In some embodiments, the one or more processes may include scanning the executable code using anti-malware software. By executing the one or more processes, the system may detect latent issues or defects that may occur within the computing systems on which the executable code is executed or installed. For instance, the system may be able to detect the existence of malware, software/hardware incompatibilities, application and/or system instability, latency issues, or the like.

In some embodiments, the system may use time-accelerated execution of the one or more processes. During the time-accelerated execution, the system may execute all of the processes (including background system processes, malware scanning, interactions with and/or installation of the executable code, and the like) according to an accelerated time scale which may be faster than real-time. For example, the system may run, in one minute of accelerated time, all of the processes that a computing system would normally run within one real-time day. By using time-accelerated process execution, the system may be able to expediently and efficiently detect issues that may arise over the passage of time (e.g., logic bombs, date/time issues, incompatibilities, or the like) that may not be immediately evident on a short timeline.

The process continues to block 206, where the system, based on executing the one or more processes, performs validation of the set of executable code. The system may maintain a log of all actions taken while executing the one or more processes on the set of executable code. Accordingly, the system may perform validation of the executable code based on the actions taken within the virtual environment instance. In some embodiments, the system may detect no issues with the executable code after executing the one or more processes. In such embodiments, validating the executable code may comprise determining that the executable code is safe to install and/or execute.

In some embodiments, the system may be configured to display a positive indicator on a graphical user interface which represents the system's finding that the executable code is safe and authorized to be installed/executed on the target computing system. For example, in embodiments in which the virtual environment is hosted on a dedicated kiosk, the display device (e.g., monitor, screen, projector, or the like) may display the positive indicator (e.g., affirmative text such as "safe" or "go," a green background, or the like) to notify the user that the executable code may be safely installed and/or executed on the target computing systems.

In other embodiments, the system may detect one or more issues arising from the actions performed on the executable code within the virtual environment. In such embodiments, validating the executable code may comprise determining that the executable code is not safe to install and/or execute. Accordingly, the system may display a negative indicator (e.g., negative text such as "unsafe" or "no go," a red background, or the like) on the display device to indicate to the user that the executable code is not authorized to be installed and/or executed on the target computing systems. In this way, the user may be able to tell at a glance whether a given set of executable code is authorized to be executed or installed on the target computing systems.

The process continues to block 206, where the system generates credentials for the executable code. Generating credentials may also include appending details about the virtual environment or target computer environment to generate a unique string of code that identifies the executable code and the environment configuration of the target computer system. The system also appends a unique string of code to signify a determination of whether or not the executable code is safe to run or potentially harmful. In other embodiments, the executable code may be flagged for further review if a specific problem cannot be diagnosed and requires further testing or human review.

The process proceeds to block 208, wherein the system processes the set of executable code and generated credentials using a data transformation algorithm to generate a data transformation output. Once the executable code has been validated, the system may use the data transformation algorithm to generate a data transformation output which is uniquely associated with the executable code, the target computer system environment, or both. In some embodiments, the data transformation algorithm may be a cryptographic hash algorithm (e.g., SHA, MD5, or the like) which may be used to generate a hash output which may reflect the exact state of the executable code as it was evaluated. Even a 1-bit deviation from the state of the executable code may result in a different hash output. Accordingly, once the hash output associated with a particular set of executable code is generated, the hash output may be subsequently used for validation of other instances of executable code encountered by the system.

The process concludes at block 210, where the system stores the data transformation output in an authorization database. In some embodiments, the authorization database may be an authorized hash database which may comprise hash values of all of the sets of executable code which have been evaluated in the virtual environment and has been validated as "safe" by the system. Accordingly, if a given set of executable code is processed using a hash algorithm and produces a hash output which matches a hash value within the authorized hash database, the system and/or the user may be able to identify the such a set of executable code as being safe to execute or install without the need to re-evaluate the executable code within the virtual environment. In this way, the system may be able to avoid unnecessary duplication of validation processes.

In other embodiments, the authorization database may be an unauthorized hash database which may comprise hash values of executable code which has been evaluated within the virtual environment and has been deemed by the system to be unsafe (e.g., the executable code contains malware). In this regard, the system may use the hash values within the unauthorized hash database to positively identify executable code which has been blocked by the system. Accordingly, if the hash values of any given set of executable code match those found within the unauthorized hash database, the system may automatically block the installation and/or execution of such executable code.

FIG. 3 illustrates a process flow 300 for blocking executable code using an authorization database and virtual validation instance, in accordance with some embodiments of the present disclosure. The process begins at block 302, where the system receives a request from a user to execute a second set of executable code. In an exemplary embodiment, the system may receive a request to validate the second set of executable code after the authorization database has been generated. Accordingly, the second set of executable code may be, for instance, an installation program that a user wishes to install on a particular target computing system. In some embodiments, the user may attempt to validate the second set of executable code using a dedicated kiosk. In other embodiments, the target computing system may, at least in part, execute the processes as described below.

The process continues to block 304, where the system processes the second set of executable code using the data transformation algorithm to generate a second data transformation output. Continuing the above examples, the system may process the second set of executable code using the same hash algorithm as the one used to generate the hashes within the authorization database. For instance, if the authorization database contains hash values generated using the SHA algorithm, the system may use the same algorithm (i.e., SHA) to process the second set of executable code to generate a second hash output.

The process continues to block 306, where the system compares the second data transformation output to one or more entries in the authorization database. Once the second hash output is generated, the system may compare the value of the second hash output with the values within the authorization database. The authorization database may contain hash values for executable code in the exact state in which the executable code existed at the time of evaluation by the system within the virtual environment. Accordingly, different versions of the same software (e.g., version 1.02 version 1.01 of a productivity application) will have different hash values such that each version of the software is evaluated separately in the virtual environment before being authorized for use and/or installation on the target computing systems. In addition, the same version of the same software will have different hash values based on configuration of the target system computer environment (e.g., hardware configuration, software configuration, user configuration, connected peripherals, or the like).

The process concludes at block 308, where the system blocks the second data transformation output based on comparing the second data transformation output with the one or more entries in the validation database. The validation database may be bifurcated in some embodiments, wherein the validation database comprises an authorized database and unauthorized database. The authorization database may be an authorized hash database which may contain hash values for sets of executable code that may have been evaluated and deemed by the system to be safe. In such an embodiment, if the hash value for any given set of executable code matches a value found within the authorized hash database, then the set of executable code may be authorized to be installed and/or executed without going through the process of evaluating the executable code within the virtual environment. In other embodiments, the authorization database may be an unauthorized hash database which may contain hash values for executable code which is explicitly unauthorized to be installed or executed by the system. In such embodiments, as shown in block 308, if the hash value of executable code matches a value found within the unauthorized hash database, the system may automatically block/deny the execution/installation of the executable code. In this way, the system may provide an efficient and secure way to control application installation and usage within the network environment.

In some embodiments, the hash value of the executable code may not explicitly match a hash value previously stored in the validation database (e.g., the hash value of the executable code does not match an authorized or unauthorized value found in the validation database, or the like). In this instance, the system may respond to the executable code in a number of fashions depending on the configuration of the system. For example, if the system is configured to execute code based on explicit list of authorized code only, then the system may automatically block the executable code if a match is not found. In other embodiments, the nonexistence of the executable code on the authorized list may be configured to prompt a forwarding of the executable code to an administrative user for administrative review. In some embodiments, this may include generating a diagnostic report that includes the details of mismatched information, such as device configuration details, software version details, or the like. In this way, one or more administrative users may automatically be provided details on the blocked execution of code such that the administrative users can quickly diagnose an issue or provide more information to the user who attempted to execute the code. For instance, in some embodiments, the diagnostic report may indicate that the user who attempted to install a particular program did no have user permission to do so, which was reflected in their system configuration. The administrative use may, in this instance, choose to upgrade the user's permissioned access to allow the user to install the program. In other instances, the diagnostic report may indicate that the user who attempted to install a particular program is on an unsecure remote network, and may communicate to the user that they are not authorized to initiate the installation process unless the user connected the target computing system to an authorized secure network.

In further embodiments, the executable code may be automatically analyzed and cataloged as described with respect to FIG. 2 using a virtual environment instance. In some embodiments, the system may initiate detailed analysis and comparison of the executable code to determine why there is a mismatch, which may be helpful in instances where executable code is believed to be authorized, but does not match authorized code in the validation database (e.g., a user attempts to install a program provided by the user's employer, but the installation is blocked due to unrecognized target computer configuration, network configuration, user authorization level, hardware components, connected peripherals, or the like).

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. patent application Ser. No. | Title | Filed On |
| --- | --- | --- |
| 16/850,525 | VIRTUAL ENVIRONMENT SYSTEM FOR SECURE EXECUTION OF PROGRAM CODE USING CRYPTOGRAPHIC HASHES | Concurrently herewith |
| 16/850,485 | VIRTUAL ENVIRONMENT SYSTEM FOR VALIDATING EXECUTABLE DATA USING ACCELERATED TIME-BASED PROCESS EXECUTION | Concurrently herewith |
| 16/850,793 | SYSTEM FOR PREVENTION OF UNAUTHORIZED ACCESS USING AUTHORIZED ENVIRONMENT HASH OUTPUTS | Concurrently herewith |
| 16/850,797 | SYSTEM FOR NETWORK ISOLATION OF AFFECTED COMPUTING SYSTEMS USING ENVIRONMENT HASH OUTPUTS | Concurrently herewith |

The invention claimed is:

1. A system for secure execution of program code within a virtual environment using cryptographic hashes, the system comprising:
a memory device with computer-readable program code stored thereon;
a communication device; and
a processing device operatively coupled to the memory device and the communication device, wherein the processing device is configured to execute the computer-readable program code to:
import executable code into a virtual environment instance;

execute, within the virtual environment instance, one or more processes on the set of executable code;

based on executing the one or more processes, perform validation of the set of executable code and generate a validation code;

import target computing system configuration details for a target computing system, wherein the target computing system configuration details comprise a hardware configuration and software configuration for the target device;

create a unique environment hash for the target computing system by combining one or more configuration details of the target computing system and encrypting the one or more configuration details;

store the unique environment hash in a validation hash database, wherein the validation hash database lists one or more devices authorizes to execute specific code;

generate credentials for the executable code based on the validation code and target computing system configuration details;

process the credentials using a data transformation algorithm to generate a data transformation output;

store the data transformation output in a validation database;

compare device configuration details or executable code version details to determine one or more mismatch details;

generate a diagnostic report, wherein the diagnostic report indicates that a user who attempted to import the executable code is on an unsecure remote network; and forward the diagnostic report to one or more users along with a request to connect using an authorized secure network in order to import executable code, specifically.

2. The system according to claim 1, wherein the computer-readable program code further causes the processing device to:

receive a request from a user to execute a second set of executable code;

process the second set of executable code using the data transformation algorithm to generate a second data transformation output;

compare the second data transformation output to one or more entries in the validation database; and block the second data transformation output based on comparing the second data transformation output with the one or more entries in the validation database.

3. The system according to claim 2, wherein the validation database is a hash database, wherein comparing the second data transformation output to one or more entries in the validation database comprises:

detecting that there is no match between the second data transformation output and any cryptographic hash value within the one or more entries in the validation database; and based on detecting that there is no match, blocking execution of the second set of executable code on the target computing system.

4. The system according to claim 3, wherein the computer-readable program code further causes the processing device to display a denial indicator to a user via a user interface, wherein the denial indicator indicates that the second set of executable code is not authorized to be executed on the target computing system.

5. The system according to claim 2, wherein the validation database is an authorized hash database, wherein comparing the second data transformation output to one or more entries in the validation database comprises:

determining that the second data transformation output does not match any of the one or more entries in the authorized hash database; and automatically blocking execution of the second set of executable code on a target computing system.

6. The system according to claim 2, wherein the validation database is an unauthorized hash database, wherein comparing the second data transformation output to one or more entries in the validation database comprises:

detecting a match between the second data transformation output and a cryptographic hash value within the one or more entries in the unauthorized hash database; and based on detecting the match, automatically blocking execution of the second set of executable code on a target computing system.

7. The system according to claim 4, wherein the computer-readable program code further causes the processing device to compare device configuration details or executable code version details to determine mismatch details;

generate a diagnostic report; and forward the diagnostic report to one or more users.

8. A computer program product for secure execution of program code within a virtual environment using cryptographic hashes, the computer program product comprising at least one non-transitory computer readable medium having computer-readable program code portions embodied therein, the computer-readable program code portions comprising executable code portions for:

importing executable code into a virtual environment instance;

executing, within the virtual environment instance, one or more processes on the set of executable code;

based on executing the one or more processes, performing validation of the set of executable code and generate a validation code;

importing target computing system configuration details for a target computing system, wherein the target computing system configuration details comprise a hardware configuration and software configuration for the target device;

creating a unique environment hash for the target computing system by combining one or more configuration details of the target computing system and encrypting the one or more configuration details;

storing the unique environment hash in a validation hash database, wherein the validation hash database lists one or more devices authorizes to execute specific code;

generating credentials for the executable code based on the validation code and target computing system configuration details;

processing the credentials using a data transformation algorithm to generate a data transformation output;

storing the data transformation output in a validation database;

compare device configuration details or executable code version details to determine one or more mismatch details;

generate a diagnostic report, wherein the diagnostic report indicates that a user who attempted to import the executable code is on an unsecure remote network; and forward the diagnostic report to one or more users along with a request to connect using an authorized secure network in order to import executable code, specifically.

9. The computer program product according to claim 8, the computer-readable program code portions further comprising executable code portions for:
receiving a request from a user to execute a second set of executable code;
processing the second set of executable code using the data transformation algorithm to generate a second data transformation output;
comparing the second data transformation output to one or more entries in the validation database; and
blocking the second data transformation output based on comparing the second data transformation output with the one or more entries in the validation database.

10. The computer program product according to claim 9, wherein the validation database is a hash database, wherein comparing the second data transformation output to one or more entries in the validation database comprises:
detecting that there is no match between the second data transformation output and any cryptographic hash value within the one or more entries in the validation database; and
based on detecting that there is no match, blocking execution of the second set of executable code on the target computing system.

11. The computer program product according to claim 10, the computer-readable program code portions further comprising an executable code portion for displaying a denial indicator to a user via a user interface, wherein the denial indicator indicates that the second set of executable code is not authorized to be executed on the target computing system.

12. The computer program product according to claim 9, wherein the validation database is an authorized hash database, wherein comparing the second data transformation output to one or more entries in the validation database comprises:
determining that the second data transformation output does not match any of the one or more entries in the authorized hash database; and
automatically blocking execution of the second set of executable code on a target computing system.

13. The computer program product according to claim 9, wherein the validation database is an unauthorized hash database, wherein comparing the second data transformation output to one or more entries in the validation database comprises:
detecting a match between the second data transformation output and a cryptographic hash value within the one or more entries in the unauthorized hash database; and
based on detecting the match, automatically blocking execution of the second set of executable code on a target computing system.

14. A computer-implemented method for secure execution of program code within a virtual environment using cryptographic hashes, wherein the computer-implemented method comprises:
importing executable code into a virtual environment instance;
executing, within the virtual environment instance, one or more processes on the set of executable code;
based on executing the one or more processes, performing validation of the set of executable code and generate a validation code;
importing target computing system configuration details for a target computing system, wherein the target computing system configuration details comprise a hardware configuration and software configuration for the target device;
creating a unique environment hash for the target computing system by combining one or more configuration details of the target computing system and encrypting the one or more configuration details;
storing the unique environment hash in a validation hash database, wherein the validation hash database lists one or more devices authorizes to execute specific code;
generating credentials for the executable code based on the validation code and target computing system configuration details;
processing the credentials using a data transformation algorithm to generate a data transformation output;
storing the data transformation output in a validation database;
comparing device configuration details or executable code version details to determine one or more mismatch details;
generating a diagnostic report, wherein the diagnostic report indicates that a user who attempted to import the executable code is on an unsecure remote network; and
forwarding the diagnostic report to one or more users along with a request to connect using an authorized secure network in order to import executable code, specifically.

15. The computer-implemented method according to claim 14, the method further comprising:
receiving a request from a user to execute a second set of executable code;
processing the second set of executable code using the data transformation algorithm to generate a second data transformation output;
comparing the second data transformation output to one or more entries in the validation database; and
blocking the second data transformation output based on comparing the second data transformation output with the one or more entries in the validation database.

16. The computer-implemented method according to claim 15, wherein the validation database is an authorized hash database, wherein comparing the second data transformation output to one or more entries in the validation database comprises:
detecting that there is no match between the second data transformation output and any cryptographic hash value within the one or more entries in the validation database; and
based on detecting that there is no match, blocking execution of the second set of executable code on the target computing system.

17. The computer-implemented method according to claim 16, the method further comprising displaying a denial indicator to a user via a user interface, wherein the denial indicator indicates that the second set of executable code is not authorized to be executed on the target computing system.

18. The computer-implemented method according to claim 15, wherein the validation database is an authorized hash database, wherein comparing the second data transformation output to one or more entries in the validation database comprises:
determining that the second data transformation output does not match any of the one or more entries in the authorized hash database; and automatically blocking execution of the second set of executable code on a target computing system.

19. The computer-implemented method according to claim 15, wherein the validation database is an unauthorized hash database, wherein comparing the second data transformation output to one or more entries in the validation database comprises:
   detecting a match between the second data transformation output and a cryptographic hash value within the one or more entries in the unauthorized hash database; and
   based on detecting the match, automatically blocking execution of the second set of executable code on a target computing system.

20. The computer-implemented method according to claim 17, the method further comprising comparing device configuration details or executable code version details to determine mismatch details;
   generating a diagnostic report; and
   forwarding the diagnostic report to one or more users.

* * * * *